(12) United States Patent
Dancausse et al.

(10) Patent No.: US 9,471,868 B2
(45) Date of Patent: Oct. 18, 2016

(54) SYSTEM, METHOD, AND APPARATUS FOR RFID HANG TAG

(71) Applicant: Avery Dennison Retail Information Solutions LLC, Mentor, OH (US)

(72) Inventors: Michael Louis Dancausse, Greensboro, NC (US); Randy Harry Gann, McLeansville, NC (US)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 14/560,532

(22) Filed: Dec. 4, 2014

(65) Prior Publication Data

US 2015/0154489 A1    Jun. 4, 2015

Related U.S. Application Data

(60) Provisional application No. 61/911,802, filed on Dec. 4, 2013.

(51) Int. Cl.
*G06K 19/02* (2006.01)
*G06K 19/077* (2006.01)

(52) U.S. Cl.
CPC ... *G06K 19/07758* (2013.01); *G06K 19/07718* (2013.01); *G06K 19/07722* (2013.01)

(58) Field of Classification Search
CPC .. G06K 19/077; G06K 13/08; G06K 7/0021; G06K 19/07749; G06K 7/0022; G07F 7/1008
USPC .................................. 235/487, 488, 492
See application file for complete search history.

(56) References Cited

U.S. PATENT DOCUMENTS

| | | | |
|---|---|---|---|
| 6,369,711 B1 | 4/2002 | Adams et al. | |
| 8,950,783 B2 * | 2/2015 | Raming | B42D 15/00 283/103 |
| 2005/0173449 A1 | 8/2005 | Sloan | |
| 2007/0126589 A1 | 6/2007 | Jacober et al. | |
| 2009/0309735 A1 | 12/2009 | Lamp | |
| 2014/0084056 A1 * | 3/2014 | Uland | 235/376 |

FOREIGN PATENT DOCUMENTS

WO    2011099973    8/2011

OTHER PUBLICATIONS

International Search Report and Written Opinion dated Jun. 9, 2015 for International Application No. PCT/US2014/068593.

* cited by examiner

*Primary Examiner* — Karl D Frech
(74) *Attorney, Agent, or Firm* — Avery Dennison Retail Information Services, LLC

(57) ABSTRACT

A hang tag may be disclosed. The hang tag can include an RFID tag, a hole, and an upper and lower portion separated by a perforation. The hang tag can additionally be manufactured on a web whereby once the tag is removed from the web, substantially no tackiness may remain on the hang tag.

15 Claims, 2 Drawing Sheets

SYSTEM, METHOD, AND APPARATUS FOR RFID HANG TAG

BACKGROUND

Radio frequency identification (RFID) labels and tags are a common tool for labelling, identifying, and tracking various goods and people. The goods so labelled involve a wide range of industries and include packages being shipped, cars, keys, livestock, identification badges, and merchandise in stores. RFID tags, either active or passive, are typically used with an RFID reader to read information from the RFID tag embedded in the label. For passive tags, a typical RFID reader/writer energizes transponder circuitry in the tag by transmitting a power signal. The power signal may convey data, which can be stored in a transponder memory, or the transponder circuitry may transmit a response signal containing data previously stored in its memory. If the transponder circuitry transmits a response signal, the RFID reader/writer receives the response signal and interprets the stored data. The data is then transmitted to a host computer for processing.

Even with a growing trend toward RFID labels, there are advantages to placing optical information on a label so that the good has both optical and RFID information, such as having the ability to read the label using more than one technology. This may be beneficial because RFID label technology is not as widespread as barcode technology, and many businesses or users may not have suitable RFID readers to read the RFID tag. Thus, it is desirable to have both RFID and optically readable information on a single label. It is common for these labels to come in the form of adhesive stickers placed, for example, on packages for shipping.

However, creating an adhesive RFID/optical label is not the best option for many applications. Adhesives can be destructive to a good's surface, for example when attempting to peel off the label. Also, adhesives do not allow a label to be re-used very easily.

Additionally, the ability to manufacture a large amount of labels in a fast and efficient manner is highly desirable.

SUMMARY

According to at least one exemplary embodiment, a hang tag may be disclosed. The hang tag can include an RFID tag, a hole, and an upper and lower portion separated by a perforation. The hang tag can additionally be manufactured on a web whereby once the tag is removed from the web, substantially no tackiness may remain on the hang tag.

BRIEF DESCRIPTION OF THE FIGURES

Advantages of embodiments of the present invention will be apparent from the following detailed description of the exemplary embodiments. The following detailed description should be considered in conjunction with the accompanying figures.

Exemplary

Exemplary

Exemplary

Exemplary

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiment are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, a hang tag may be disclosed. The hang tag can include an RFID tag, a hole, and an upper and lower portion separated by a perforation. The hang tag can additionally be manufactured on a web whereby once the tag is removed from the web, substantially no tackiness may remain on the hang tag.

Figure 1:
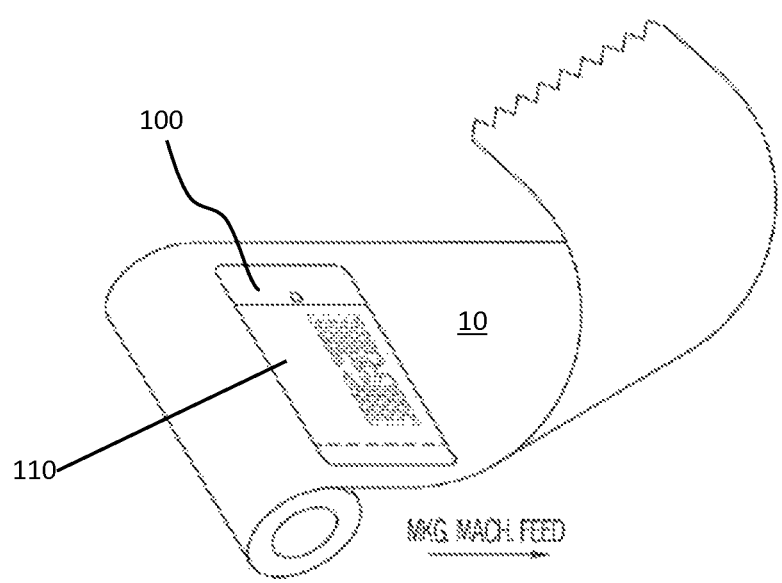
FIG. 1 shows an RFID hang tag.

Exemplary FIG. 1 shows a label 100 which may include an upper portion 110 and a lower portion 120. The label 100 of the present invention, once removed from web 10 may act as a tag in one embodiment. Upper portion 110 may include radio frequency identification (RFID) aspect such as tag 130 which may be a conventional passive or active RFID tag. The size, dimension, and position of RFID tag 130 are shown for discussion and illustration purposes, and do not indicate a preferred size or placement of the tag. RFID tag 130 may further include an antenna, a transponder, a memory, and/or an optional energy storage device, or as desired for a particular application. In one embodiment, the RFID tag 130 uses a strap for attachment of a chip to the antenna. RFID tag 130 may be interrogated and read via any suitable RFID reader. Additionally, RFID tag 130 may be re-programmable or fixed, or as desired.

Upper portion 110 may also include an opening such as a hole 140. Hole 140 may be used to hang label 100 on a product or other object. Hole 140 may be of any size, as desired. Upper portion 110 may be separated from lower portion 120 by a perforation 150. Perforation 150 may allow a user to easily separate upper portion 110 from lower portion 120. Those skilled in the art will appreciate that other means of separation may also be used, such as a partial depth-wise cut disposed along the complete width of the label. The separation means can also simply be a printed indicia that indicates to the user where the label is to be cut for separation.

FIG. 1 illustrates that the label 100 of the present invention may be manufactured in roll form and that once the label 100 is printed and the RFID component of the label 100 is encoded, a hang tag, ticket or label that is yielded which has rounded corners and acts like a peel off or piggy back ticket, hang tag, and/or label. In one embodiment, the ticket, hang tag, and/or label that is removed from a web, has at least four fully rounded corners and is free of notches. The present invention contemplates the corners of the tag, ticket or label are not limited to a rounded shape but may be any sort of geometrical shape.

Figure 2:
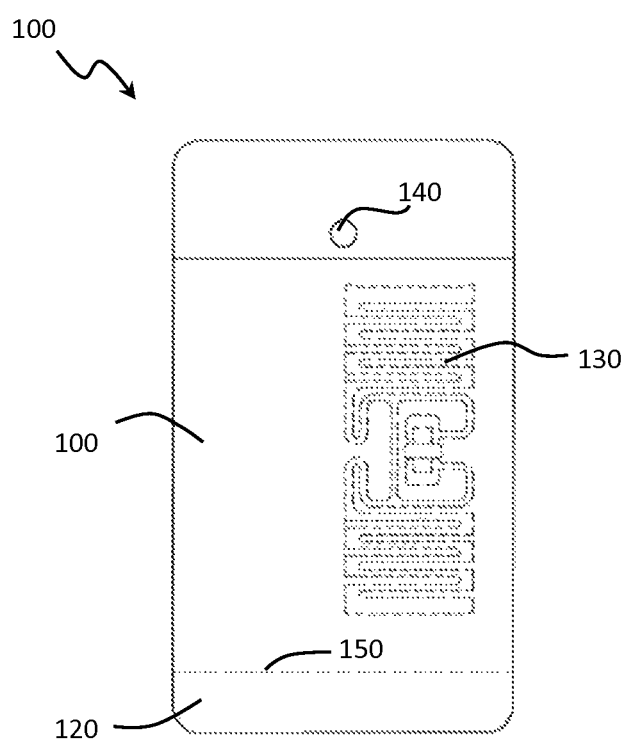
FIG. 2 shows an RFID hang tag on a web for printing.
Figure 3:
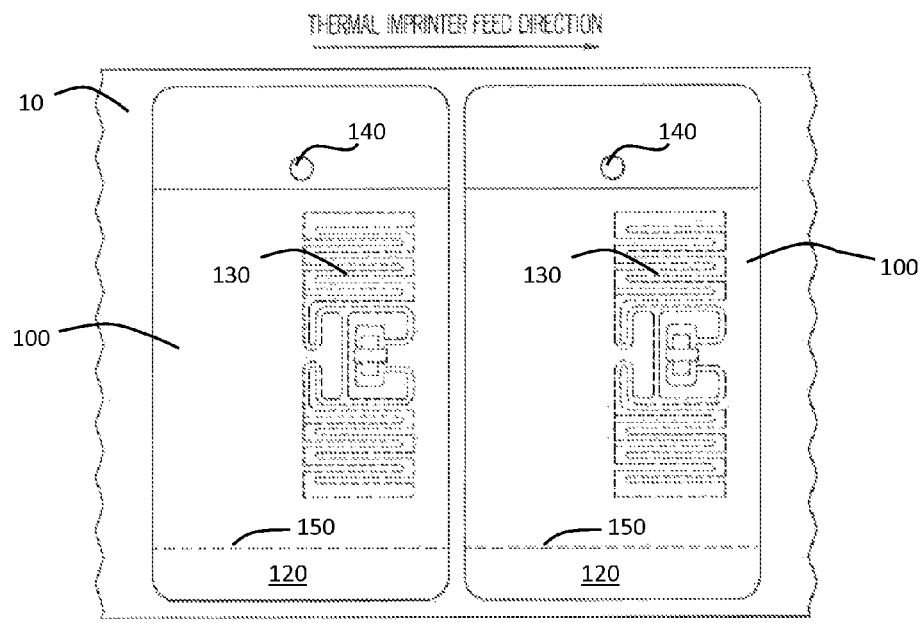
FIG. 3 shows a cross-section view of an RFID hang tag on a web.

Now referring to exemplary FIGS. 1, 2 and 3, label 100 may be manufactured on a web 10. Multiple labels 100 may be manufactured upon a single web 10, which may be an efficient method of manufacture of labels 100. Additionally, label 100 and web 10 may be constructed in a layered or laminated fashion. Cuts or dies made using any sort of cutter such as a die cutter, a laser cutter, may be used to define the shape of label 100 upon web 10 and allow for a user to easily peel label 100 off of web 10. In a preferred embodiment of the present invention, the label having an integrated RFID tag 130 acts as a piggy back type of label which may be used for example as a peel off coupon on a product in a store.

Label 100 may include a tag stock 160, an RFID tag 130, a first adhesive layer 170, and a liner 180. Tag stock 160 may be a material on which optically readable information can be printed. The tag stock 160 of the present invention may be any sort of material and is not limited to paper, plastic, fabric. In some non-limiting examples, the optically readable information may be a bar code, text, symbols, and/or numbers. Liner 180 may be a conventional release liner, for example a silicone-covered liner. In one embodiment of the present invention, the liner is a bleached glassine white liner with good roll label roll label converting properties designed for low to medium speed dispensing applications. Adhesive layer 170 may bond tag stock 160, RFID tag 130, and liner 180 together such that when label 100 is removed from web 10, label 100 remains structurally sound. The present invention contemplates that the liner 180 in one embodiment of the invention, the liner becomes part of the label 100 so that when the label 100 is removed the web 10, the liner 280 is part of the label construction and the adhesive 14 and face stock of the web 10 is discarded.

Web 10 may include a face stock 12 and a second adhesive layer 14. Face stock 12 may be any conventional face stock for a printing web. Adhesive layer 14 may keep label 100 in contact with web 10 at least while printing, encoding, and manufacturing. Further, adhesive layer 14 may remain on web 10 when label 100 is removed from web 10 by a user. The contact interface between liner 180 and adhesive layer 14 may be designed such that upon removal from web 10, label 100 may retain substantially no tackiness and thus the end label may serve as a label, ticket or hang tag.

Multiple labels 100 may be printed on a single web 10, and each label 100 may be defined by a cut, for example a die cut, such that each label 100 may be lifted or peeled off of web 10 when desired.

According to at least one non-limiting exemplary embodiment and referring generally to exemplary FIGS. 1-4, at least one, and optionally a plurality, of a label 100 may be manufactured on a web 10. A tag stock 160, an RFID tag 130, a first adhesive layer 170, a liner 180, a second adhesive layer 14, and a face stock 12 may be combined in a laminated fashion. RFID tag 130 may be encoded with a particular set of information, and tag stock 160 may have optically readable information printed upon it. Once removed from web 10, label 100 may have substantially no tackiness on it due to the inherent properties of liner 180. Additionally, label 100 may have an opening 140 and a perforation 150 defined upon it and may be utilized in an RFID system for labeling and/or tracking goods. Label 100 may be hung upon an object using hole 140. An external reader may interrogate RFID tag 130 to obtain information stored in RFID tag 130 and/or information may be obtained by reading the optically readable information printed on tag stock 160. Lower portion 120 may be removed if desired, for example for record-keeping purposes.

Figure 4:
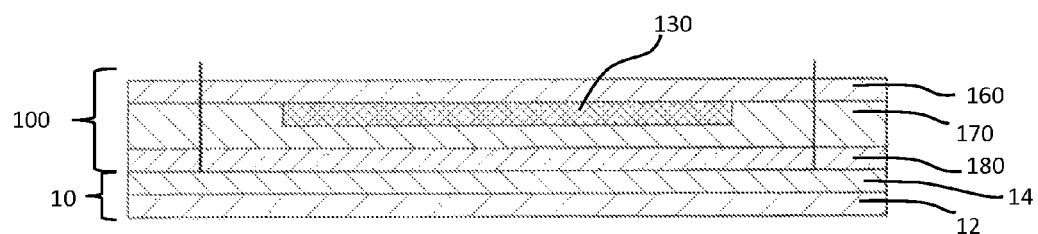
FIG. 4 shows a cross section of a label 100 adhered to a web 10 of the present invention.

FIG. 4 of the present invention illustrates a cross section of the label 100 adhered to a web 10 in which the label 100 may be removed from web 10 such that the liner 180 becomes a part of the label construction. The label 100 of FIG. 4 comprises a tag stock 160, a RFID component 130, a first adhesive layer 170 and a liner 180. The tag stock 160 has a first 161 and second face 162 in which a first adhesive layer is adhered to the second face 162 of the tag stock 160. The RFID component or tag 130 is located on the second face 162 of the tag 130 and the periphery of the adhesive layer 170 extends beyond the total area of the RFID component 130. Thus, the second face 162 of the tag stock 160 is in contact with both the RFID component 130 and the first adhesive layer 170 and the first adhesive layer 170 adheres the RFID component 130 to the second face 162 of the tag stock 160. The first adhesive layer has both a first 171 and second face 172 in which a liner 180 is adhered to the second face 172 of the adhesive layer 170. The liner 180, as illustrated in FIG. 4, may be adhered to a web portion 10 that includes a second adhesive layer 14 and a face stock 12.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A label comprising:
   a tag stock having a first and second face and the tag stock has optically readable information printed upon on at least one of the first and second faces,
   an RFID component having an area and adhered to the second face of the tag stock by a first face of a first adhesive layer having a first and second face and an outer periphery extending beyond the area of the RFID component,
   and a glassine white liner adhered to the second face of the first adhesive layer,
   wherein the label is adhered to a web such that when the label is removed from the web the liner becomes part of the label and the label has at least one opening to hang the label from an object.

2. The label of claim 1, wherein the web comprises a second adhesive layer and a face stock.

3. The label of claim 1, wherein the label once removed from the web may serve as a hang tag.

4. The label of claim 1, wherein the label is a piggyback label.

5. The label of claim 1, wherein the label is manufactured using a roll-to-roll process.

6. The label of claim 1, wherein the label is free of notches.

7. A tag comprising:
   a RFID component on an upper portion of a tag stock such that the tag stock has a lower portion and the upper and lower portion are separated by at least one separation means;
   wherein the tag has at least one opening that is used to hang the tag from an object and the hang tag is manufactured on a web whereby once the tag is removed from the web no tackiness remains on the tag; and
   wherein the tag has at least four rounded corners and acts as a piggybag tag.

8. The tag of claim 7, wherein the tag is manufactured using a roll to roll process.

9. The tag of claim 7, wherein the upper portion contains the RFID component.

10. The tag of claim 7, wherein the upper portion contains the at least one opening.

11. The tag of claim 7, wherein multiple tags are produced on the same web.

12. The tag of claim 7, wherein the separation means is a perforation.

13. The tag of claim 7, wherein the separation means is a partial depth-wise cut.

14. The tag of claim 7, wherein the lower portion is removed.

15. The tag of claim 7, wherein the tag stock has optically readable information printed upon it.

* * * * *